US008963023B2

(12) United States Patent
Phillips et al.

(10) Patent No.: US 8,963,023 B2
(45) Date of Patent: Feb. 24, 2015

(54) ENCLOSURE FOR ELECTRONICS

(75) Inventors: Nickolas Phillips, Laguna Niguel, CA (US); Dusan Jankov, Huntington Beach, CA (US); Victor S. Pak, San Mateo, CA (US)

(73) Assignee: Pakedge Device & Software, Inc., Hayward, CA (US)

( * ) Notice: Subject to any disclaimer, the term of this patent is extended or adjusted under 35 U.S.C. 154(b) by 653 days.

(21) Appl. No.: 13/239,088

(22) Filed: Sep. 21, 2011

(65) Prior Publication Data
US 2012/0073874 A1 Mar. 29, 2012

Related U.S. Application Data

(60) Provisional application No. 61/387,827, filed on Sep. 29, 2010.

(51) Int. Cl.
*H05K 7/14* (2006.01)
*H01H 9/02* (2006.01)
(Continued)

(52) U.S. Cl.
CPC . *H02G 3/123* (2013.01); *H02G 3/20* (2013.01)
USPC ............. 174/542; 174/58; 174/484; 174/486; 174/491; 439/131; 220/3.3; 16/365

(58) Field of Classification Search
CPC .. H01R 13/4532; H01R 13/46; H01R 13/501; H01R 13/453; H02G 3/08; H02G 3/12; H02G 3/18; H02G 3/185; A47B 21/06
USPC ....... 226/17 CT, 53, 54, 55, 57, 58, 482, 483, 226/484, 485, 486, 487, 488, 489, 490, 491, 226/542, 559, 560, 561, 562, 563; 52/29; 439/131; 220/3.3, 3.8, 3.9; 16/269, 16/365, 374; 174/17 CT, 53, 54, 55, 57, 174/58, 482, 483, 484, 485, 486, 487, 488, 174/489, 490, 491, 542, 559, 560, 561, 562, 174/563
See application file for complete search history.

(56) References Cited

U.S. PATENT DOCUMENTS 2,141,449 A * 12/1938 Rathbun .......................... 16/262
3,622,684 A * 11/1971 Press .............................. 174/486
(Continued)

FOREIGN PATENT DOCUMENTS

JP 06276649 A * 9/1994 ............... H02G 3/18

OTHER PUBLICATIONS

Machine Translation of Tsuda (JP 06276649 A) provided with Office Action.*
Definition of "axis" from www.meriam-webster.com Aug. 20, 2014.*

*Primary Examiner* — Chau N Nguyen
*Assistant Examiner* — Roshn Varghese

(57) ABSTRACT

An electronics enclosure includes a housing having a body section that has a hollow or open interior for containing electrical devices. The body section is configured for flush mounting in a ceiling, wall or other structure. The enclosure includes a moveable front panel that pivots to flip between a closed position and an open position. An electronic device may be mounted to the back surface of the front panel, to be hidden from view when the panel is closed and to be accessible when the panel is open. The enclosure includes anchoring mechanisms that rotate between first and second positions, to anchor the enclosure in the ceiling, wall or other structure.

12 Claims, 2 Drawing Sheets

(51) Int. Cl.
*H01H 13/04* (2006.01)
*H01H 19/04* (2006.01)
*H01H 21/04* (2006.01)
*H01H 23/04* (2006.01)
*H01R 13/46* (2006.01)
*H02G 3/08* (2006.01)
*H02G 3/20* (2006.01)
*H01R 13/44* (2006.01)
*H01R 13/60* (2006.01)
*E05D 7/00* (2006.01)
*H02G 3/12* (2006.01)

(56) References Cited

U.S. PATENT DOCUMENTS

| | | | |
|---|---|---|---|
| 5,230,552 A * | 7/1993 | Schipper et al. | 312/223.6 |
| 6,359,220 B2 * | 3/2002 | Schiedegger et al. | 174/50 |
| 6,478,587 B2 * | 11/2002 | Sharples | 439/131 |
| 6,737,576 B1 * | 5/2004 | Dinh | 174/50 |
| 6,894,219 B2 * | 5/2005 | Culbertson | 174/50.53 |
| 6,969,800 B1 * | 11/2005 | Liao | 174/50 |
| 7,380,310 B2 * | 6/2008 | Koessler | 16/267 |
| 7,816,604 B1 * | 10/2010 | Gretz | 174/58 |
| 8,007,295 B2 * | 8/2011 | Lin | 439/131 |
| 2002/0125031 A1 * | 9/2002 | Gilleran | 174/58 |

* cited by examiner

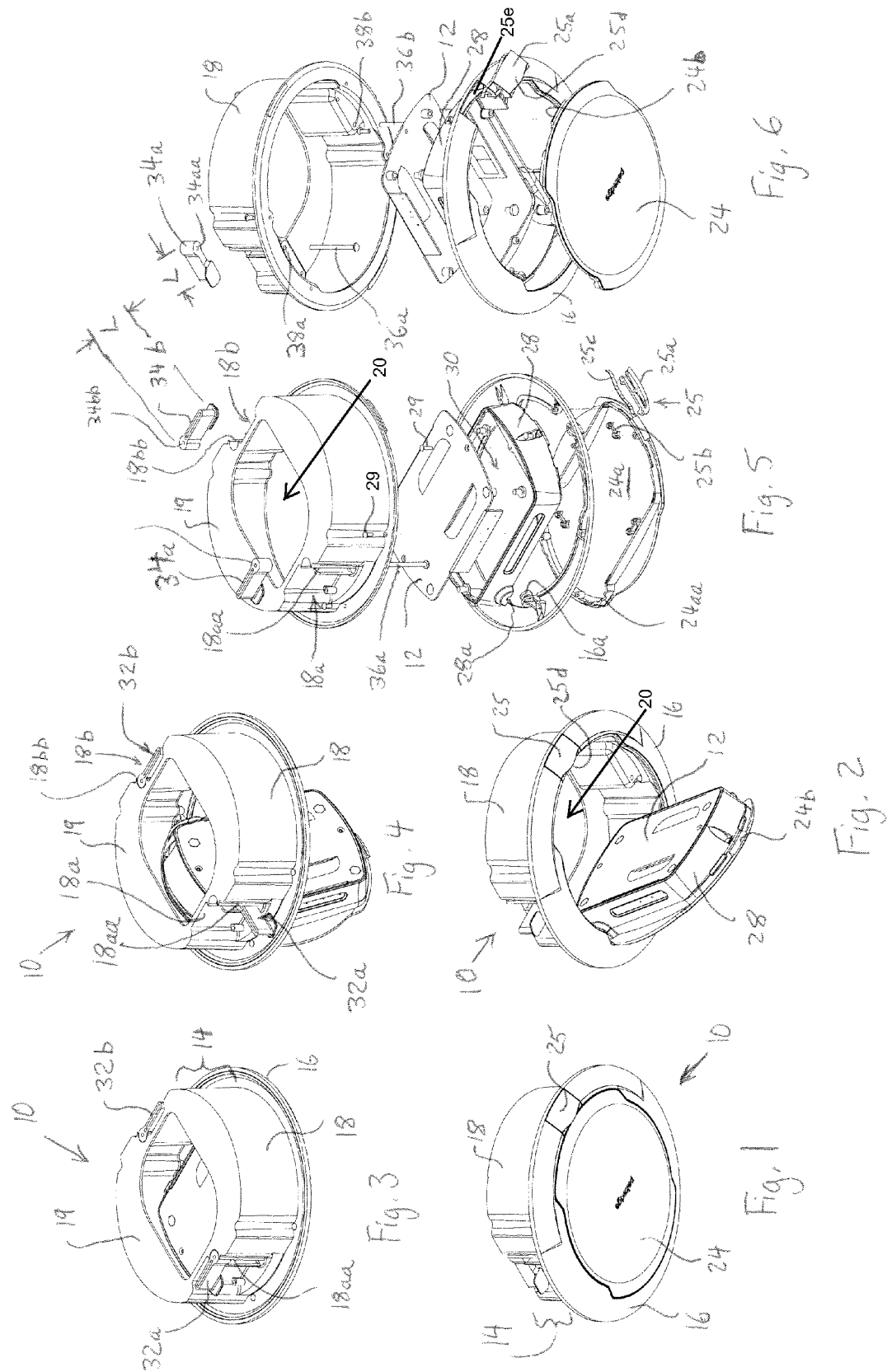

ENCLOSURE FOR ELECTRONICS

CROSS-REFERENCE TO RELATED PATENT APPLICATIONS

This application claims priority from Provisional Application U.S. Application 61/387,827, filed Sep. 29, 2010, titled "Recessed Electronics Enclosure," which is incorporated herein by reference in its entirety.

BACKGROUND

1. Field of the Invention

Embodiments of the present invention relate generally to enclosures for electronics and, in particular embodiments, recessed or surface-mount enclosures that mount in or on a ceiling, wall or other suitable structure, for holding one or more electrical devices or electrical components.

2. Related Art

Custom integration of electronics into houses, office buildings, schools or other structures has become a common part of new construction, as well as post-construction improvements. For example, electronic components (including, but not limited to, network routers, speakers, cameras, smoke/fire alarms, etc.) have been mounted in ceilings, walls and other structures, at locations where they can perform desired functions.

As the popularity of custom electronics integration continues to increase, embodiments of the present invention provide new and improved devices and processes for installing electronic devices and components in houses, buildings or other structures, in a functional, yet aesthetically pleasing manner, and that also allows easy access to the electrical devices or components, after installation.

SUMMARY OF THE DISCLOSURE

Embodiments of the present invention relate generally to enclosures for electronics and, in particular embodiments, recessed enclosures that mount in a ceiling, wall or other suitable structure, for holding one or more electrical devices or electrical components.

According to embodiments of the present invention, an electronics enclosure includes a housing having a body section and an annular lip. The body section of a housing has a hollow or open interior for containing one or more electrical devices or components. The body section is configured to be mounted to a ceiling, wall or other structure, for example, in a flush-mount or recessed manner. When mounted in a flush-mount or recessed manner, at least a portion (or all) of the body section is hidden from view within the ceiling, wall or other structure, while the lip remains on the viewable surface side of the ceiling, wall or other structure. Other embodiments are configured for surface mounting on a surface of a ceiling, wall or other structure.

The enclosure also includes a moveable front panel within the annular lip. The front panel is mounted to move between a closed position (at which the panel covers and closes the hollow or open interior of the body section) and an open position (at which the panel exposes at least a portion of the hollow or open interior of the body section and/or one or more electronic devices or components housed by the enclosure, to allow access to the electronic device(s) or component(s)). In one embodiment the moveable front panel is configured to pivot or flip between closed and open positions. A manually operated latch is provided to selectively lock the front panel in the closed position, and selectively unlock the front panel to allow it to swing or flip to the open position.

The back surface of the front panel (the surface that faces into the interior of the body section when the front panel is in the closed position) is provided with retaining structure for securing and holding one or more electronic devices or components. The electronic device(s) or component(s) that are secured and held on the back surface of the front panel are located within the interior of the body section, when the front panel is in the closed position. On the other hand, when the front panel is pivoted to the open position, the electronic device(s) or component(s) that are secured to and held on the back surface of the front panel are exposed and accessible.

The enclosure includes one or more anchoring mechanisms for anchoring the enclosure to the ceiling, wall or other structure. In one embodiment, the anchoring mechanisms include two anchor members that, each, selectively pivot between a first position (in which their length dimensions extend along a side surface of the body section) and a second position (in which their length dimensions extend outward from the body section in a dog-ear fashion). The anchor members are supported on threaded shafts that are accessible from inside of the body section of the enclosure, when the front panel is of the enclosure is open. In that manner, when the front panel is open, the threaded shafts may be accessed and rotated, to rotate the anchor members from the first position to the second position and then to draw the anchor members along the lengths of the shafts (and selectively grip a portion of the ceiling wall or other structure between the anchor members and the lip).

The enclosure may be mounted to a ceiling, wall or other structure, by cutting a hole in the ceiling, wall or other structure, where the hole has a size and shape sufficient to allow the body portion of the enclosure to pass through the hole and at least partially into the ceiling, wall or other structure, when the anchoring members are in the first pivot position. Once the body section of the enclosure is located within the ceiling, wall or other structure, the anchoring mechanisms may be operated and turned to the second pivot position (where their length dimensions extend outward from the body section) and then further operated to grip a portion of the ceiling, wall or other structure, as described above.

Once the body section of the enclosure is anchored, one or more electrical devices or components that are secured and held on the back surface of the front panel can be housed within the enclosure by simply closing the front panel. Cables, wires and other electrical, optical, mechanical or other conductors (for power, data or the like) that are located within the ceiling, wall or other structure, can be connected to the electrical device(s) or component(s), during or after the mounting process.

When the enclosure is mounted in a recessed or flush-mount manner and the front panel is in the closed position, a large portion of the enclosure is hidden from view within the ceiling, wall or other structure, while the lip and the outer-facing surface of the front panel remain on the viewable side of the ceiling, wall or other structure. In particular embodiments, the lip and front panel are formed in an aesthetically pleasing, low-profile dome shape, for minimal protrusion from the viewable surface of the ceiling, wall or other structure. The latch can be located within a recess in the lip 25e, so as to become a portion of the overall dome shape appearance feature.

Accordingly, embodiments of the present invention provide an electronics enclosure that is relatively compact, aesthetically pleasing and easy to install and operate, and that can be mounted in a recessed or flush-mount manner, in any suitable ceiling, wall or other structure. Embodiments are configured for simplified installation and to allow easy access for servicing or replacing electronic devices and components housed therein. Furthermore, embodiments of the present invention are configured such that the parts of the enclosure can be manufactured with relatively high efficiencies in cost, materials and time. For example, many of the parts of the enclosure structure can be made by common injection molding techniques. However, other embodiments may be made according to any suitable manufacturing techniques.

BRIEF DESCRIPTION OF THE DRAWINGS

FIG. 1 is a front-side perspective view of an electronics enclosure in a closed state, according to an embodiment of the present invention.

FIG. 2 is a front-side perspective view of the electronics enclosure of FIG. 1, in an open state.

FIG. 3 is a rear-side perspective view of the electronics enclosure of FIG. 1.

FIG. 4 is a rear-side perspective view of the electronics enclosure of FIG. 1, in an open state.

FIG. 5 is a rear-side exploded, perspective view of the electronics enclosure of FIG. 1.

FIG. 6 is a front-side exploded, perspective view of the electronics enclosure of FIG. 1.

DETAILED DESCRIPTION

Figure 7:
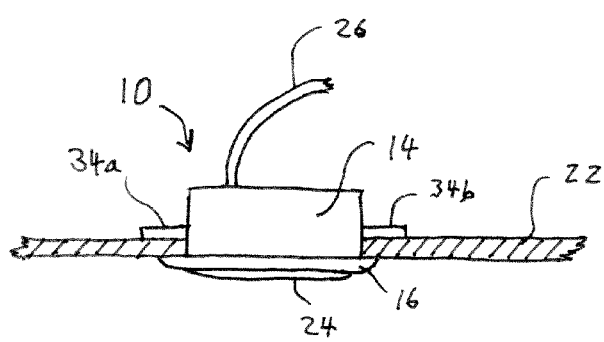
FIG. 7 is a side view of the electronics enclosure of FIG. 1, mounted in a recessed or flush-mount manner within a ceiling (shown in cross-section).

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for providing a thorough understanding of the present disclosure. However, it will be apparent to those skilled in the art that the present disclosure may be practiced without these specific details. Acronyms and other descriptive terminology may be used merely for convenience and clarity and are not intended to limit the scope of the present disclosure.

Embodiments of the present invention relate generally to enclosures for electronics. Particular embodiments relate to recessed enclosures that mount in a ceiling, wall or other suitable structure, for holding and/or concealing electronics or electrical components within the ceiling, wall or other structure.

The electronics enclosures according to various different embodiments of the present invention may be configured with various different shapes, sizes and aesthetic designs, dependent upon the context of use and desired visual appearance qualities. In the example, illustrated embodiment, an enclosure having a generally round, cylindrical shape and a generally circular, low-profile dome-shaped front surface is shown and described. The electronics enclosure houses one or more electrical devices or components within a ceiling, wall or other structure. When installed in a ceiling, wall or other structure, the enclosure in the illustrated example visually appears as a circular dome, having a relatively low profile (for example, extending less than an inch, such as about ¾ inch, from the outer-facing surface of the ceiling, wall or other structure). However, other embodiments may have other suitable shape, appearance, profile and design features. Embodiments of the present invention are configured for easy installation, service and maintenance, as well as cost efficient manufacturing.

An electronics enclosure as described herein includes a pivoting (or otherwise moveable) front panel that pivots (or otherwise moves) from a closed position to an open position, to allow easy access to the interior of the enclosure for installation and for installing, removing or servicing electrical devices or components contained therein. Anchoring mechanisms for anchoring the electronics enclosure to a ceiling, wall or other structure are accessible and operable when the front panel is open. However, when the front panel is closed, the electronic device(s) or component(s) contained in the enclosure, as well as hardware of the anchoring mechanisms, are hidden from view behind an aesthetically pleasing dome-shaped structure. In other embodiments described herein, the front panel may be moveable between open and closed positions in manners other than a pivotal movement.

An electronics enclosure 10 according to an embodiment of the present invention is shown in FIGS. 1-8. The electronics enclosure 10 is configured for containing one or more electrical devices or components. (The part labeled 12 is a cover for a housing of an electrical device or component. However, in other embodiments described below, the part labeled 12 represents a cover portion of a retaining structure for retaining an electrical device or component within a space bordered by the cover 12.) Any suitable electrical device(s) or component(s) may be housed by the enclosure 10, including, but not limited to network routers, speakers, cameras, smoke/fire alarms, network switches, or the like. Such electronic components can be connected to wiring located within the ceilings, walls or other structures. In some embodiments, such electronic devices employ wireless communication protocols (such as, but not limited to TCP/IP, Bluetooth, WiFi, WPAN, or the like) for communicating with other local and/or remote electronic devices.

The electronics enclosure 10 according to embodiments of the present invention may be provided and installed in a ceiling, wall or other structure, without an electrical device or component initially contained therein (but where the electrical device or component can be installed in the electronics enclosure 10, after the electronics enclosure 10 has been obtained and/or installed in a ceiling, wall or other structure). In other embodiments, the electronics enclosure 10 may produced and/or installed in a ceiling, wall or other structure, with an electrical device or component already pre-installed within the enclosure 10.

Figure 8:
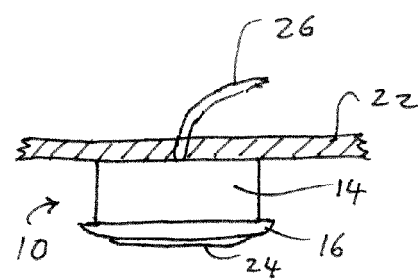
FIG. 8 is a side view of an electronics enclosure, mounted in a surface-mount manner on a ceiling (shown in cross-section).

The electronics enclosure 10 of FIGS. 1-7 is configured to be installed in a ceiling, wall or other structure in a recessed or flush mount manner. In that regard, when installed, a portion of the electronics enclosure 10 resides within the ceiling, wall or other structure, while another portion (such as a minimal portion) of the enclosure 10 extends outward from an exposed surface of the ceiling, wall or other structure (as shown in FIG. 7). However, other embodiments may be configured for surface mount installations, in which the enclosure 10 is mounted on an external (e.g., outward-facing) surface of a ceiling, wall or other structure, in a manner in which the entire enclosure 10 is external to the ceiling, wall or other structure (such as shown in FIG. 8).

The electronics enclosure 10 of FIGS. 1-8 includes a body section 14 and a lip 16. The lip 16 comprises an annular ring-shaped structure that is open in its center. The body section 14 has one or more outer wall(s) 18 surrounding an open or hollow interior volume 20. The body section 14 is open on a first end (the lip end) to the interior volume 20. The body section 14 also includes a back panel 19 at a second end (opposite to the first end), such that the back panel 19 defines a back end of hollow interior volume 20.

For recessed or flush-mounted embodiments, the back panel 19 is located within the ceiling, wall or other structure, when the enclosure 10 is installed in the ceiling, wall or other structure (e.g., as shown in FIG. 7). For surface-mount embodiments, the back panel 19 is configured to mount (attach) to an outward-facing surface of a ceiling, wall or other structure, when the enclosure 10 is installed on the ceiling, wall or other structure by any suitable attachment devices including, but not limited to, screws, bolts, clips, adhesive materials, or the like (e.g., as shown in FIG. 8).

The body section 14, including the outer wall(s) 18 and the back panel 19 in FIGS. 1-8, is configured as a single, integral, unitary structure, for example, by suitable injection molding, other molding, machining or other manufacturing techniques. However, in other embodiments, the body section 14, including the outer wall(s) 18 and back panel 19 may be configured as separate components and attached together (by suitable attachment structure including, but not limited to screws, bolts, clips, adhesive materials, welds, or the like) to form the body section 14.

The lip 16 in FIGS. 1-8 is a separate member that is attached to the outer wall(s) 18, at one end of the body section 14. In the illustrated embodiment, the lip 16 is attached to a flange portion of the wall(s) 18 by screws 29. However, in further embodiments, the lip 16 is attached to the body section 14 by other suitable attachment structure or can be made integral with the outer wall(s) 18. In yet further embodiments, the lip 16 may be omitted.

In FIGS. 1-8, the lip 16 extends circumferentially outward from the body section 14, at one end of the body section 14. The body section 14 is open at the lip end, such that the interior volume 20 of the body section 14 is exposable and accessible, through the open center of the lip 16. The lip 16 and the body section 14 (including the outer wall(s) 18 and back panel 19) may be made of any suitably rigid and durable materials, including, but not limited to plastic, metal, ceramic, composite materials or combinations thereof. In one embodiment, the lip 16 and body section 14 are made of the same material. In other embodiments, the lip 16 and body section 14 are made of different materials, respectively. In particular embodiments, the lip 16 is made by suitable injection molding techniques. However, in other embodiments, other suitable molding, machining or other manufacturing techniques may be employed to make the lip 16.

With reference to FIG. 7, when installed in a ceiling, wall or other structure, the body section 14 resides partially or fully within the ceiling, wall or other structure (generally represented as 22 in FIG. 7), while the lip 16 resides adjacent an external-facing surface of the ceiling, wall or other structure. Accordingly, when installed, the body section 14 is partially or fully hidden from view within the ceiling, wall or other structure 22, while the lip 16 is exposed on the outward-facing side of the ceiling, wall or other structure 22. As described in more detail, below, cables, wires, optical fibers, or other suitable conductors 26 or mechanical connectors or fluid pipes or tubes (depending upon the type of electrical device or component that is housed in the enclosure) may be concealed within the ceiling, wall or other structure and routed to the electrical device or component 12, through one or more openings in the body section 14 (e.g., wall(s) 18 and/or back panel 19), when electronics enclosure 10 is mounted in the ceiling, wall or other structure. An alternative surface-mount arrangement is shown in FIG. 8, where the back panel 19 is attached to an external-facing surface of the ceiling, wall or other structure.

The electronics enclosure 10 of FIGS. 1-8 includes a moveable front panel 24 arranged within the center opening of the lip 16, for selectively covering the open end of the body section 14. The moveable front panel 24 may be made of any suitable material such as those described above with respect to the body section 14. In one embodiment the moveable front panel 24 is made of the same material as the wall(s) 18, back panel 19 and/or lip 16. In other embodiments, the front panel 24 may be made of a different material than one or more of the wall(s) 18, back panel 19 and lip 16. In particular embodiments, the front panel 24 is made by suitable injection molding techniques. However, in other embodiments, other suitable molding, machining or other manufacturing techniques may be employed to make the front panel 24.

The moveable front panel 24 is selectively moveable from a first panel position to a second panel position. In the first panel position, the front panel 24 covers the center opening of the lip 16 and, thus, covers the open or hollow interior 20 of the body section 14, at the lip 16 end of the body section 14 (as shown in FIG. 1). In the second panel position, the front panel 24 opens to at least partially expose the hollow interior 20, through the center opening of the lip 16 (as shown in FIG. 2). When in the second panel position, a back-side surface of the front panel 24 (the surface of the panel 24 that faces into the interior 20 of the body section 14, when the panel 24 is in the first or closed panel position) is exposed and accessible. A latch mechanism 25 is provided to secure and hold the front panel 24 in the first panel position (closed position) and to allow a user to selectively unlatch the latch mechanism and allow the front panel 24 to move to the second panel position (open position). In further embodiments, one or more springs may be provided to urge the front panel 24 toward the second (open position) and, thus cause the front panel to automatically move at least partially toward the second (open position) when the latch mechanism 25 is unlatched.

In embodiments as shown in FIGS. 1-8, the front panel 24 connects with a hinged connection and is moveable in a pivotal motion, between a closed position (shown in FIGS. 1 and 3) and an open position (shown in FIGS. 2 and 4). While other embodiments may include any suitable hinge connections, the embodiment in FIGS. 1-8 employs a pair of hinged connections. Each of the hinged connections is composed of a pair of arched surfaces, one on a frame 28 of a retaining structure (described below) and another on the front panel 24. The arched surfaces are arranged around (to rotate around) a cylindrical surface on the lip 16.

More specifically, in the illustrated embodiment, the lip 16 includes a pair of generally cylindrical hubs (one shown in FIGS. 5 at 16a, the other arranged in a corresponding location on the lip, across the central opening in the lip). The frame 28 includes a first arched surface 28a that has a radial dimension corresponding to the outer radial dimension of the cylindrical hub 16a. The front panel 24 has a second arched surface 24aa that has a radial dimension corresponding to the outer radial dimension of the cylindrical hub 16a. The frame 28 and front panel 24 each includes a similar arched surface at a corresponding location (not viewable in the drawings) on the opposite side of the frame 28 and front panel 24, respectively.

The arched surfaces 28a and 24aa, together, form an annular rail that partially or fully surrounds the cylindrical hub 16a and allows the frame 28 and front panel 24 to rotate, together, around the outer cylindrical surface of the cylindrical hub 16a. With a similar structure of arched surfaces and a cylindrical hub positioned in a corresponding location on the opposite side of the lip 16, panel 24 and frame 28, the front panel 24 (with the frame 28) is pivotally attached to and supported by the lip 16. In this manner the front panel 24 is supported for pivotal motion and may be selectively and manually pivoted between the first and second panel positions, to selectively flip open or close the enclosure 10.

The arched surfaces 28a and 24aa and the cylindrical hub 16a may be formed integral with the frame 28, front panel 24 and lip 16, respectively, as shown in the illustrated embodiments. For example, such structures may be formed as part of a molding process and/or by machining those forms into the frame 28, front panel 24 and lip 16, as a unitary, integral structures therewith. However, in further embodiments, one or more of the arched surfaces 28a and 24aa and the cylindrical hub 16a are formed separately from the frame 28, front panel 24 and/or lip 16 and then attached thereto by any suitable attachment structure, including but not limited to screws, bolts, clips, adhesive materials, welds, combinations thereof or the like.

In further embodiments, other suitable connection structures may be provided on the front panel and one or both of the lip 16 and body section 14, for selectively, manually closing and opening the enclosure 10, including, but not limited to screws, bolts, tab and slot connection structures, clips, adhesive materials, friction-fitting parts, combinations thereof or the like.

The latch mechanism 25 in FIGS. 1-8 includes a latch body 25a configured to be manually pressed by a user (fore example, a one-finger push operation). The latch body 25a is mounted to the lip 16 by a bracket 25b and spring 25c, to allow the latch body 25a to move against the spring force of the spring 25c. The latch body 25a is moveable from a first (un-pressed) position to a second (pressed) position, when pressed by the user, and returns to its first (un-pressed) position under the return force of the spring 25c, when released by the user.

The latch body 25a includes a latch surface 25d that is positioned on one side of (the outward-facing side) and adjacent to a stop surface 24b on the front panel 24, when the front panel 24 is in the closed position (FIGS. 1 and 3) and the latch body is in the first (un-pressed) position. In that position, the latch body 25a inhibits the front panel 24 from moving to the open position. When pressed with sufficient force to overcome the spring 25c, the latch body 25a moves to the second (pressed) position, where the latch surface 25d is moved sufficiently away from or past the stop surface 24b, to allow the front panel 24 to move from the closed panel position (shown in FIGS. 1 and 3) to the open panel position (shown in FIGS. 2 and 4).

The latch body 25a may be made of any suitable material, including, but not limited to the materials described above with respect to the lip 16. In particular embodiments, the latch body 25a is made by suitable injection molding techniques. However, in other embodiments, other suitable molding, machining or other manufacturing techniques may be employed to make the latch body 25a.

In the embodiment of FIGS. 1-8, the latch body 25a fits within a recess formed in the lip 16 and has a shape and size that corresponds to the shape of the recess and outer surface of the lip 16, such that the latch body 25a visually appears to be part of the lip 16. However, in other embodiments, other suitable latch mechanisms may be employed for securing or holding the front panel 24 in its closed position and for allowing a user to selectively (either manually or non-manually) release the front panel 24 from its latched state, to open the front panel 24.

The front panel 24 includes a back-side surface 24a (the surface of the panel 24 that faces into the interior 20 of the body section 14, when the panel 24 is in the first or closed panel position). Retaining structure is provided on the back-side surface 24a, to retain and hold an electrical device or component (not shown) on the back-side of the panel 24. In FIGS. 1-6, the retaining structure includes a frame 28 for holding the housing 12 of an electronic device or component.

In further embodiments, the part labeled 12 in the drawings represents a further portion of the retaining structure that selectively connects to and disconnects from the frame 28 and, when connected to the frame 28, defines a hollow or open interior 30, suitable for holding an electronic device or component. In such embodiments, part 12 is a cover that selectively connects and disconnects from the frame 28 (with suitable connector structures such as, but not limited to one or more screws 29) and, when disconnected from the frame 28, provides access to the interior space 30 and any electronic device or component held therein. In such embodiments, the cover part 12 can be configured to selectively connect and disconnect from the frame 28 in any suitable manner, including, but not limited to screws, bolts, adhesive materials, friction fitting parts, combinations thereof, or the like.

The frame 28 may be formed, integral with the front panel 24. In other embodiments, the frame 28 may be made separately and then connected to the back-side surface 24a of the panel 24 with any suitable connection structure, including, but not limited to screws, bolts, adhesive materials, welds, friction fitting parts, combinations thereof, or the like. In one embodiment the frame 28 and cover part 12 may each be made of the same material as the front panel 24. In other embodiments, the frame 28 and/or cover part 12 may be made of a different material than the front panel 24. In particular embodiments, the frame 28 is made by suitable injection molding techniques. However, in other embodiments, other suitable molding, machining or other manufacturing techniques may be employed to make the frame 28. While the embodiment of FIGS. 1-6 employs a frame and cover structure, other embodiments may employ any other suitable retaining structure to retaining an electrical device or component on the back-side surface 24a (or other surface) of the panel 24, including, but not limited to, one or more screws, bolts, adhesive materials, brackets, welds, friction-fitting parts, combinations thereof, or the like.

When an electrical device or component is retained or held on the back-side surface of the front panel 24, and the front panel 24 is in a closed position (as shown in FIG. 1), the electrical device or component fits at least partially or fully into the open or hollow interior 20 of the body section 14 and is hidden from view by the front panel 24. On the other hand, when the front panel 24 is moved to an open position (as shown in FIG. 2), then the back-side surface of the front panel 24 (and any electrical device or component retained on that surface) is exposed, moved outward and viewable, for example, to allow installation, visual inspection, servicing, replacement, repair or other actions on the electrical device or component. In that regard, the enclosure 10 may be selectively closed (to hide the electrical device or component within the enclosure 10) or opened (to provide ready access to install, inspect, service, replace, repair or take other actions on the electrical device or component).

The electronics enclosure 10 of FIGS. 1-7 includes anchoring structures for retaining the enclosure 10 in a recessed or flush-mounted position in a ceiling, wall or other structure (as shown in FIG. 7). In the illustrated embodiment, the enclosure 10 includes two anchoring structures 32a and 32b, arranged on mutually opposite sides of the enclosure 10 (on opposite diametric positions of the wall 18 of the body section 14). In other embodiments, the enclosure has only one or, in yet further embodiments, more than two anchoring structures positioned in any suitable locations on the enclosure 10.

The anchoring structure 32a in the embodiment of FIGS. 1-7 includes an anchor member 34a having a length dimension L that is longer that its width dimension (perpendicular to the length dimension L)). The anchoring member 34a has a threaded aperture 34aa adjacent one end of its length dimensions L. The anchor member 34a is supported in a cantilevered manner by a threaded shaft 36a (such as, but not limited to a screw or bolt), threaded into the aperture 34aa. Similarly, the anchoring structure 32b includes an anchor member 34b having a length dimension L and a threaded aperture 34bb, and that is supported in a cantilevered manner by a threaded shaft 36b. The anchor members 34a and 34b may be made of any suitable material, including, but not limited to plastic, metal, ceramic, composite materials or combinations thereof. In particular embodiments, the anchor members 34a and 34b are made by suitable injection molding techniques. However, in other embodiments, other suitable molding, machining or other manufacturing techniques may be employed to make the anchor members 34a and 34b.

As shown in FIGS. 5 and 6, the wall(s) 18 of the body section 14 is recessed at 18a and 18b, corresponding to the respective locations of the anchoring structure 32a and 32b. The body section 14 includes an aperture 38a and 38b at each recess 18a and 18b, through which the shafts 36a and 36b extend, respectively. The shafts 36a and 36b, each include a head end and a threaded end. When extended through the apertures 38a and 38b, the head ends of the shafts 36a and 36b are located on one side of the apertures 38a and 38b, respectively, while threaded ends of the shafts 36a and 36b extend from the other side of the apertures 38a and 38b, respectively.

The threaded ends of the shafts 36a and 36b are engaged with corresponding threads on the inside of the apertures 34aa and 34bb in anchor members 34a and 34b, respectively. The shafts 36a and 36b are rotatable (about their longitudinal axes) within the apertures 38a and 38b of the in the body section 14. The head ends of the shafts 36a and 36b may be shaped with grooves, indentations, outer peripheral configurations, or the like, for engaging tools, such as, but not limited to screw drivers, wrenches or the like, to allow a user to easily rotate the shafts 36a and 36b about their longitudinal axes.

By rotation of the shafts 36a and 36b, the anchor members 34a and 34b on the threaded end of the shafts 36a and 36b are rotated, between a first rotation position (as shown in FIGS. 1 and 3) and a second rotation position. In the first rotation position (FIGS. 1 and 3), the anchor members 34a and 34b are positioned with their length dimension L extending adjacent or along the wall 18 of the body section 14, within the recesses 18a and 18b, respectively. In the second rotation position, the anchor members 34a and 34b are positioned with their length dimension L extending outward from wall 18 of the body section 14, for example, in a dog-eared fashion.

As described below, the anchor members 34a and 34b can be arranged in the first position (FIGS. 1 and 3), when the body section 14 of the enclosure is installed in (passed through) an opening in a ceiling, wall or other structure. Once the anchor members 34a and 34b are within and clear the ceiling, wall or other structure, the anchor members 34a and 34b are rotated to the second position. When in the second position, side edges of the anchor members 34a and 34b abut stop surfaces 18aa and 18bb in the recesses 18a and 18b, respectively. In that position, further rotation of the threaded shafts 36a and 36b (in the direction from the first position toward the second position) causes the threaded apertures 34aa and 34bb in the anchor members to thread further along the threaded shafts 36a and 36b, respectively, to draw the anchor members 34a and 34b toward the lip 16 end of the body section 14. In this manner, the anchor members 34a and 34b move (are drawn) toward the lip 16 and clamp a portion of a ceiling, wall or other structure between the anchor members 34a and 34b and the lip 16, to anchor the enclosure 10 in the ceiling, wall or other structure, as shown in FIG. 7.

More specifically, the enclosure 10 may be mounted in a recessed or flush-mount manner by cutting or otherwise providing a single hole through an outer-facing surface of a ceiling, wall or other structure, where the hole has a size and/or shape too small to allow the lip 16 to pass through, but sufficient to allow the body section 14 (or, in some embodiments, a portion of the body section 14) to pass through the hole, when the anchor members 34a and 34b are in the first position. The size and/or shape of the hole in the ceiling, wall or other structure is selected so as to be too small to allow the body section 14 to pass through the hole when the anchor members 34a and 34b are in the second position (outward extended position).

After formation of the hole, the body section 14 of the enclosure 10 (with the anchor members 34a and 34b arranged in the first position) is passed through the hole, from the back panel 19 end of the body section. In this manner, the body section 14 is positioned at least partially in (or through) the ceiling, wall or other structure, so as to be hidden from view within the ceiling, wall or other structure. At the same time, the lip 16 remains on the outer-facing surface side of the ceiling, wall or other structure and may help cover the edge(s) of the hole in the ceiling, wall or other structure (for example, to cover any gap between the edge(s) of the hole and the wall 18 of the body section 14), as shown in FIG. 7.

Once the body section is positioned within the ceiling, wall or other structure, the anchoring structures 32a and 32b are operated to anchor the enclosure 10 to the ceiling, wall or other structure. To operate the anchoring structures 32a and 32b, the front panel 24 is opened (as shown in FIGS. 2 and 4), to provide access to the head ends of the shafts 36a and 36b.

To anchor the enclosure 10, the anchor members 34a and 34b are rotated from the first rotation position (as shown in FIGS. 1 and 3) to the second rotation position (in which the length dimension L of the anchor members 34a and 34b extends outward, in a dog-ear fashion). More specifically, the shafts 36a and 36b are rotated about their longitudinal axes, for example, by engaging and operating a screw driver, wrench or other suitable tool or a hand on the head ends of the shafts 36a and 36b. As the shafts 36a and 36b are rotated, the anchor members 34a and 34b initially rotate with the shafts 36a and 36b to the second rotation position at which side surfaces of the anchor members 34a and 34b abut the stop surfaces 18aa and 18bb, respectively.

The shafts 36a and 36b are, then, further rotated. However, because the side surfaces of the anchor members 34a and 34b are abutted against the stop surfaces, the anchor members 34a and 34b do not continue to rotate with the shafts. As a result, the further rotation of the shafts 36a and 36b causes the anchor members 34a and 34b to thread along the length of the shafts 36a and 36, respectively, and move toward the head end of the shafts 36a and 36b, while remaining in the second rotation position (for example, extended outward in a dog-ear fashion). In that manner, the anchor members 34a and 34b are drawn toward an interior-facing surface of the ceiling, wall or other structure, while extending outward (dog-eared) in the second rotation position.

The anchor members 34a and 34b are further drawn in that direction, until the anchor members 34a and 34b contact the interior facing surface of the ceiling, wall or other structure, while the lip 16 contacts the outer-facing surface of the ceiling, wall or other structure (as shown in FIG. 7). The shafts 35a and 36b may be rotated to sufficiently clamp and grip a portion of the ceiling, wall or other structure between the lip 16 and anchor members 34a and 34b, to anchor the enclosure 10 to the ceiling, wall or other structure.

While the embodiment in FIGS. 1-7 employs a dog-ear style anchoring configuration, other embodiments may employ other suitable anchoring structures. Furthermore, while embodiments described above include two anchoring mechanisms, other embodiments may employ a single anchoring mechanism or more than two anchoring mechanisms arranged around the periphery of the enclosure.

Also, while the body section 14 in FIGS. 1-8 has a partial, cylindrical shape with a partially circular cross-section and the lip 16 has a generally round, ring shape. However, in other embodiments, those features may have any other suitable shapes and configurations, including, but not limited to, generally square, rectangular, other polygons, oval, other curved configuration or combinations thereof.

The embodiments disclosed herein are to be considered in all respects as illustrative, and not restrictive of the invention. The present invention is in no way limited to the embodiments described above. Various modifications and changes may be made to the embodiments without departing from the spirit and scope of the invention. The scope of the invention is indicated by the attached claims, rather than the embodiments. Various modifications and changes that come within the meaning and range of equivalency of the claims are intended to be within the scope of the invention.

What is claimed is:

1. An electronics enclosure comprising:
    a body section having an outer wall structure surrounding an interior volume, the generally cylindrical outer wall structure having a diametric axis, the body section having an open end;
    an annular lip arranged around the open end of the body section, the annular lip extends outward relative to the generally cylindrical outer wall structure of the body section and has an open center;
    a moveable panel supported by the annular lip for pivotal movement relative to the body section between a first position and a second position, the moveable panel being arranged over the open end of the body section and within the open center of the annular lip to cover the interior volume of the body section when in the first position, the moveable panel being arranged to expose at least a portion of the interior volume when in the second position, the moveable panel having a rear surface that faces toward the interior volume of the body section when the moveable panel is in the first position and the moveable panel is attachable to the body section at a location other than the diametric axis of the body section;
    at least one cylindrical member supported by the annular lip, each cylindrical member having a generally cylindrical outer surface, wherein the moveable panel has at least one arched surface, each arched surface extending at least partially around the generally cylindrical outer surface of the cylindrical member, the arched surface of the moveable panel being movable at least partially around the generally cylindrical outer surface as the moveable panel is pivotally moved between the first position and the second position;
    a latch member for selectively locking the moveable panel in the first position and selectively unlocking the moveable panel to allow the moveable panel to move toward the second position;
    a spring mechanism operatively coupled with the moveable panel and the body section for urging the moveable panel at least partially toward the second position; and
    retaining structure on the rear surface of the moveable panel for retaining one or more electrical devices or components on the rear surface of the moveable panel, in a position to be housed within the interior volume of the body section and hidden from view from outside of the body section when the moveable panel is in the first position and to be accessible from outside of the body section when the moveable panel is in the second position, wherein the retaining structure comprises a frame on the rear surface of the moveable panel, the frame having at least one arched surface, each arched surface of the frame extending at least partially around the generally cylindrical outer surface of the cylindrical member, the arched surface of the frame being movable at least partially around the generally cylindrical outer surface as the moveable panel is pivotally moved between the first position and the second position.

2. An electronics enclosure as recited in claim 1, wherein the cylindrical member is formed integral with the annular lip, as a unitary body.

3. An electronics enclosure as recited in claim 1, wherein the frame surrounds a volume for containing the one or more electronic devices or components.

4. An electronics enclosure as recited in claim 1, further comprising at least one anchoring mechanism for anchoring the body section to a ceiling or wall.

5. An electronics enclosure as recited in claim 4, wherein the at least one anchoring mechanism comprises a plurality of anchoring mechanisms coupled to and arranged around the generally cylindrical outer wall structure of the body section.

6. An electronics enclosure as recited in claim 5, wherein:
    each anchoring mechanism comprises an anchor member supported on a shaft for rotation between a first anchor member position and a second anchor member position, each shaft being supported for rotation by the body section to selectively rotate the anchor member supported thereon;
    each anchor member has a longitudinal dimension L that extends along the wall structure of the body section when the anchor member is in the first anchor member position; and
    the longitudinal dimension L of each anchor member extends outward from the wall structure of the body section when the anchor member is in the second anchor member position.

7. An electronics enclosure as recited in claim 6, wherein:
    each anchor member has a threaded aperture;
    each shaft has a threaded portion engaged with corresponding threads in the threaded aperture of the anchor member supported thereon;
    each anchor member is supported to rotate in a first rotary direction between the first anchor member position and the second anchor member position, by rotation of the shaft in the first rotary direction;
    each anchor member engaging a stop surface that inhibits further rotation of the anchor member, upon the anchor member being rotated to the second anchor member position, where further rotation of the shaft causes the anchor member to thread further and move along the length dimension L of the shaft.

8. An electronics enclosure as recited in claim 1, wherein the movable panel is arranged within the open center of the annular lip; and wherein the latch member is arranged within the recess of the annular lip.

9. The electronics enclosure as recited in claim 1, wherein the location has a pivot point for the moveable panel.

10. The electronics enclosure as recited in claim 1, wherein the moveable panel is pivotal about a pivot axis.

11. A method of making an electronics enclosure comprising:

forming a body section having an outer wall structure surrounding an interior volume, the generally cylindrical outer wall structure having a diametric axis, the body section having an open end;

arranging an annular lip around the open end of the body section, the annular lip extends outward relative to the generally cylindrical outer wall structure of the body section and has an open center;

supporting a moveable panel on the annular lip for pivotal movement relative to the body section between a first position and a second position, the moveable panel being arranged over the open end of the body section and within the open center of the annular lip to cover the interior volume of the body section when in the first position, the moveable panel being arranged to expose at least a portion of the interior volume when in the second position, the moveable panel having a rear surface that faces toward the interior volume of the body section when the moveable panel is in the first position and the moveable panel is attachable to the body section at a location other than the diametric axis of the body section;

supporting at least one cylindrical member on the annular lip, each cylindrical member having a generally cylindrical outer surface, wherein the moveable panel has at least one arched surface, each arched surface extending at least partially around the generally cylindrical outer surface of the cylindrical member, the arched surface of the moveable panel being movable at least partially around the generally cylindrical outer surface as the moveable panel is pivotally moved between the first position and the second position;

supporting a latch member on the annular lip for selectively locking the moveable panel in the first position and selectively unlocking the moveable panel to allow the moveable panel to move toward the second position;

operatively coupling a spring mechanism with the moveable panel and the body section for urging the moveable panel at least partially toward the second position;

supporting retaining structure on the rear surface of the moveable panel for retaining one or more electrical devices or components on the rear surface of the moveable panel, in a position to be housed within the interior volume of the body section and hidden from view from outside of the body section when the moveable panel is in the first position and to be accessible from outside of the body section when the moveable panel is in the second position, wherein the retaining structure comprises a frame on the rear surface of the moveable panel, the frame having at least one arched surface, each arched surface of the frame extending at least partially around the generally cylindrical outer surface of the cylindrical member, the arched surface of the frame being movable at least partially around the generally cylindrical outer surface as the moveable panel is pivotally moved between the first position and the second position.

12. An electronics enclosure comprising:

a body section having a generally cylindrical outer wall structure surrounding an interior volume, the generally cylindrical outer wall structure having a diametric axis, the body section having an open end;

an annular lip arranged around the open end of the body section, the annular lip extends outward relative to the generally cylindrical outer wall structure of the body section and has an open center;

a moveable panel supported by the annular lip for pivotal movement relative to the body section between a first position and a second position, the moveable panel being arranged over the open end of the body section and within the open center of the annular lip to cover the interior volume of the body section when in the first position, the moveable panel being arranged to expose at least a portion of the interior volume when in the second position, the moveable panel having a rear surface that faces toward the interior volume of the body section when the moveable panel is in the first position and the moveable panel is attachable to the body section at a location other than the diametric axis of the body section;

at least one cylindrical member supported by the annular lip, each cylindrical member having a generally cylindrical outer surface, wherein the moveable panel has at least one arched surface, each arched surface extending at least partially around the generally cylindrical outer surface of the cylindrical member, the arched surface of the moveable panel being movable at least partially around the generally cylindrical outer surface as the moveable panel is pivotally moved between the first position and the second position; and retaining structure on the rear surface of the moveable panel for retaining one or more electrical devices or components on the rear surface of the moveable panel, in a position to be housed within the interior volume of the body section and hidden from view from outside of the body section when the moveable panel is in the first position and to be accessible from outside of the body section when the moveable panel is in the second position, wherein the retaining structure comprises a frame on the rear surface of the moveable panel, the frame being friction-fit to the moveable panel, the frame surrounding a volume for containing the one or more electronic devices or components, the frame having at least one arched surface, each arched surface of the frame extending at least partially around the generally cylindrical surface of the cylindrical member, the arched surface of the frame being movable at least partially around the generally cylindrical surface as the moveable panel is pivotally moved between the first position and the second position.

\* \* \* \* \*

UNITED STATES PATENT AND TRADEMARK OFFICE
CERTIFICATE OF CORRECTION

PATENT NO. : 8,963,023 B2
APPLICATION NO. : 13/239088
DATED : February 24, 2015
INVENTOR(S) : Nickolas Phillips, Dusan Jankov and Victor S. Pak Page 1 of 1

It is certified that error appears in the above-identified patent and that said Letters Patent is hereby corrected as shown below:

In the Claims

In claim 1, col. 11, line 39, that portion reading "an" should read --a generally cylindrical--.

In claim 8, col. 13, line 6, that portion reading ";" should read --,--. In claim 8, col. 13, line 7, that portion reading "the recess" should read --a recess--.

In claim 11, col. 13, line 14, that portion reading "an" should read --a generally cylindrical--.

Signed and Sealed this
Eighth Day of September, 2015

Michelle K. Lee
*Director of the United States Patent and Trademark Office*